United States Patent
Zhang

(10) Patent No.: US 10,290,214 B2
(45) Date of Patent: May 14, 2019

(54) LANE CHANGE SYSTEM AND LANE CHANGE CONTROLLER

(71) Applicants: DENSO International America, Inc., Southfield, MI (US); DENSO CORPORATION, Kariya, Aichi-pref. (JP)

(72) Inventor: Yu Zhang, Farmington Hills, MI (US)

(73) Assignees: DENSO International America, Inc., Southfield, MI (US); DENSO CORPORATION, Kariya-city ( * ) Notice: Subject to any disclaimer, the term of this patent is extended or adjusted under 35 U.S.C. 154(b) by 86 days.

(21) Appl. No.: 15/484,275

(22) Filed: Apr. 11, 2017

(65) Prior Publication Data

US 2018/0293894 A1 Oct. 11, 2018

(51) Int. Cl.
| | |
|---|---|
| *G08G 1/16* | (2006.01) |
| *G05D 1/00* | (2006.01) |
| *G05D 1/02* | (2006.01) |
| *B60W 30/10* | (2006.01) |
| *G01S 19/13* | (2010.01) |

(52) U.S. Cl.
CPC .............. *G08G 1/167* (2013.01); *B60W 30/10* (2013.01); *G05D 1/0061* (2013.01); *G05D 1/0214* (2013.01); *G01S 19/13* (2013.01); *G05D 1/0231* (2013.01)

(58) Field of Classification Search
CPC .... G08G 1/167; G05D 1/0061; G05D 1/0214; G05D 1/0231; B60R 2300/804; B60R 1/00; B60R 11/04; G01S 19/13
See application file for complete search history.

(56) References Cited

U.S. PATENT DOCUMENTS

| | | | | |
|---|---|---|---|---|
| 5,521,579 A | * | 5/1996 | Bernhard ........... | B60K 31/0008 180/167 |
| 2013/0184926 A1 | * | 7/2013 | Spero ..................... | B62D 1/28 701/26 |
| 2015/0355641 A1 | * | 12/2015 | Choi ...................... | G05D 1/021 701/23 |
| 2016/0185279 A1 | * | 6/2016 | Zagorski ................. | B60Q 1/34 701/36 |
| 2017/0151958 A1 | * | 6/2017 | Sakuma ................ | B60W 50/10 |
| 2017/0197627 A1 | * | 7/2017 | Wieneke .............. | G05D 1/0088 |
| 2017/0200371 A1 | * | 7/2017 | Glander ................. | G05D 1/021 |
| 2017/0232970 A1 | * | 8/2017 | Schaper .......... | B60W 30/18163 701/36 |
| 2017/0361853 A1 | * | 12/2017 | Nagy .................... | B60W 50/14 |

(Continued)

*Primary Examiner* — Mussa A Shaawat

(57) ABSTRACT

A lane change system for a subject vehicle including a peripheral monitor, an instruction portion, a direction indicator, a vehicle guide system, and a lane change controller is provided. The peripheral monitor obtains information regarding an adjacent lane and a lane boundary line. The instruction portion outputs a lane change initiation signal at a time of a lane change. The direction indicator provides another vehicle with an indication of an intention of the lane change. The vehicle guide system controls an operation of the subject vehicle. The lane change controller is configured to: detect the lane boundary line; control the subject vehicle to approach the lane boundary line and reach a position located from a predetermined approach distance; wait for elapse of a period of time; and control the vehicle guide system to move the subject vehicle to the adjacent lane.

7 Claims, 9 Drawing Sheets

(56) References Cited

U.S. PATENT DOCUMENTS

| | | | |
|---|---|---|---|
| 2018/0025645 A1* | 1/2018 | Schwindt | G01S 13/931 |
| | | | 701/301 |
| 2018/0075538 A1* | 3/2018 | Konrardy | G06Q 40/08 |
| 2018/0079409 A1* | 3/2018 | Nath | B60W 30/12 |
| 2018/0086347 A1* | 3/2018 | Shaikh | B60W 40/09 |
| 2018/0101997 A1* | 4/2018 | Dudar | B60H 1/008 |
| 2018/0126986 A1* | 5/2018 | Kim | B60W 30/09 |
| 2018/0186371 A1* | 7/2018 | Sterniak | B60W 30/10 |

\* cited by examiner

FIG. 3E
FIG. 3F
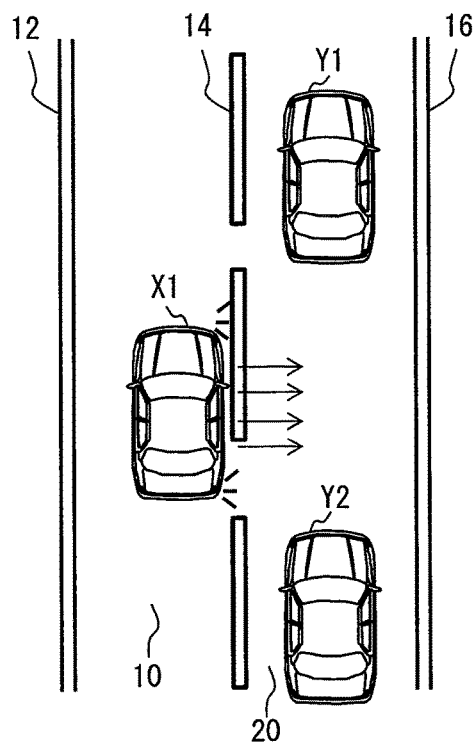
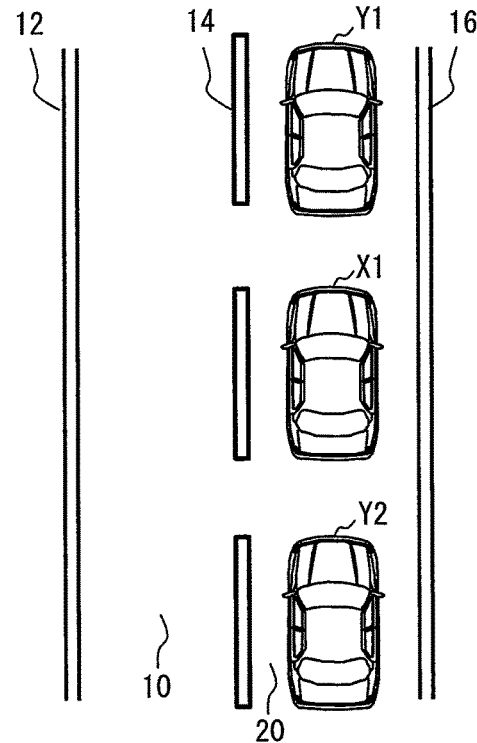

LANE CHANGE SYSTEM AND LANE CHANGE CONTROLLER

TECHNICAL FIELD

The present disclosure relates to a technology to change a drive lane during driving a vehicle.

BACKGROUND

This section provides background information related to the present disclosure, which is not necessarily prior art.

A vehicle may be configured to operate in an autonomous driving mode in which an operation by a driver is little involved in controlling the vehicle. For example, during driving in the autonomous driving mode, the vehicle keeps in the middle of a drive lane and switches on a turn signal light before changing to another drive lane.

The inventor of the present disclosure has found the following. When the vehicle driving in a current drive lane attempts to change a drive lane to an adjacent lane, or when the vehicle drives in a merging lane and moves to a drive lane, the vehicle turns on a turn signal light (a blinker) to indicate an intention of lane change for a neighboring vehicle including an adjacent vehicle driving in the adjacent lane.

The traffic may be busy or stopped, or the vehicle is within a blind spot for a driver of the adjacent vehicle driving in the adjacent lane. In this case, the driver in the adjacent lane may not recognize the blinking turn signal light of the vehicle, or may not recognize the intention of the driver attempting the lane change.

The driver in the adjacent lane may not make space for accepting the vehicle attempting the lane change due to the above reasons or another reason. It may be difficult for the vehicle to change the drive lane to the adjacent lane or merge into the drive lane.

It may be difficult for an elderly person to change a drive lane or to merge into a drive lane since judgment capability and physical capability may be deteriorated. It may be difficult for an inexperienced driver to change a drive lane or to merge into a drive lane. Such an inexperienced driver may feel nervous when the driver needs to perform the lane change.

SUMMARY

It is an object of the present disclosure to provide a lane change system and a lane change controller, which increase noticeability of attempt of lane change by a vehicle and likelihood of a lane change of a vehicle.

In one aspect, a lane change system for a subject vehicle including a peripheral monitor, an instruction portion, a direction indicator, a vehicle guide system, and a lane change controller is provided. The peripheral monitor obtains information regarding an adjacent lane and a lane boundary line separating a current drive lane from the adjacent lane, when the subject vehicle is located on the current drive lane. The instruction portion outputs a lane change initiation signal at a time of a lane change of the subject vehicle upon receiving a lane change instruction. The direction indicator provides another vehicle with an indication of an intention of the lane change upon receiving the lane change initiation signal. The vehicle guide system controls an operation of the subject vehicle. The lane change controller is configured to: (i) detect the lane boundary line based on the information received from the peripheral monitor and calculate a distance between the subject vehicle and the lane boundary line; (ii) control the subject vehicle to approach the lane boundary line and reach a position located from a predetermined approach distance away from the lane boundary line by the vehicle guide system; (iii) wait for elapse of a period of time while providing the indication of the intention the lane change to another vehicle; and (iv) control the vehicle guide system to further move the subject vehicle from the current drive lane at the predetermined approach distance to the adjacent lane.

In another aspect, a lane change controller for a subject vehicle driving in a current drive lane including a processor and a memory is provided. The memory is coupled to the processor and stores instructions executable by the processor to cause the processor to: (i) detect a lane boundary line separating the current drive lane and an adjacent lane and detect the adjacent lane; (ii) receive an instruction indicating a lane change of the subject vehicle to implement a lane change from the current drive lane to the adjacent lane; (iii) cause, upon the instruction, the subject vehicle to approach the lane boundary line and reach a position located from a predetermined approach distance away from the lane boundary line; (iv) cause, upon the instruction, indication of an intention of the lane change to another vehicle; (v) wait for elapse of a predetermined period of time while providing the indication; (vi) determine whether a sufficient space exists between a vehicle in the adjacent lane ahead of the subject vehicle and a vehicle in the adjacent lane behind the subject vehicle; and (vii) cause, upon determination that the sufficient space exists, the subject vehicle to move from the current drive lane to the adjacent lane.

In another aspect of the present disclosure, a lane change system for a subject vehicle including: a peripheral monitor that obtains information regarding an adjacent lane and a lane boundary line separating a current drive lane from the adjacent lane, when the subject vehicle is located on the current drive lane; a direction indicator that provides another vehicle with an indication of an intention of the lane change ; and a lane change controller configured to: (i) detect the lane boundary line based on the information received from the peripheral monitor and calculate a distance between the subject vehicle and the lane boundary line; (ii) control the subject vehicle to approach the lane boundary line and reach a specified position located from a predetermined approach distance away from the lane boundary line ; (iii) wait for elapse of a period of time while providing the indication of the intention of the lane change to another vehicle; and (iv) control the vehicle to further move the subject vehicle from the specified position to the adjacent lane is provided.

According to this configuration, it is possible increases noticeability of attempt of lane change by a vehicle and likelihood of a lane change of a vehicle.

BRIEF DESCRIPTION OF DRAWINGS

The above and other objects, features and advantages of the present disclosure will become more apparent from the following detailed description made with reference to the accompanying drawings. In the drawings:

FIG. 3E is a view illustrating the continuation of the multi-step lane change situation;

FIG. 3F is a view illustrating the continuation of the multi-step lane change situation;

DETAILED DESCRIPTION

Figure 1:
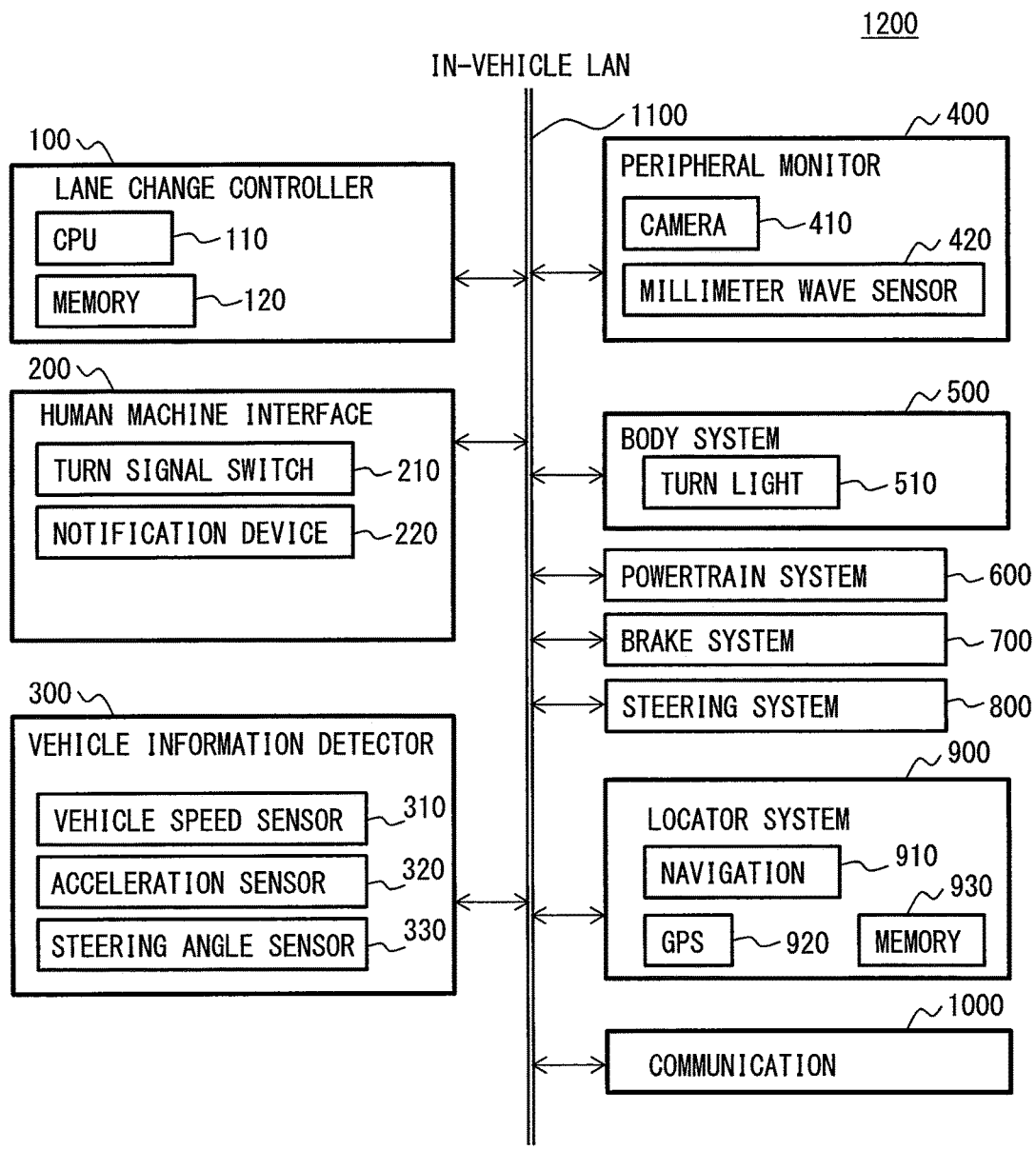
FIG. 1 is a block diagram illustrating a lane change system including a lane change controller and related vehicle components and systems according to a present embodiment.
Figure 3A:
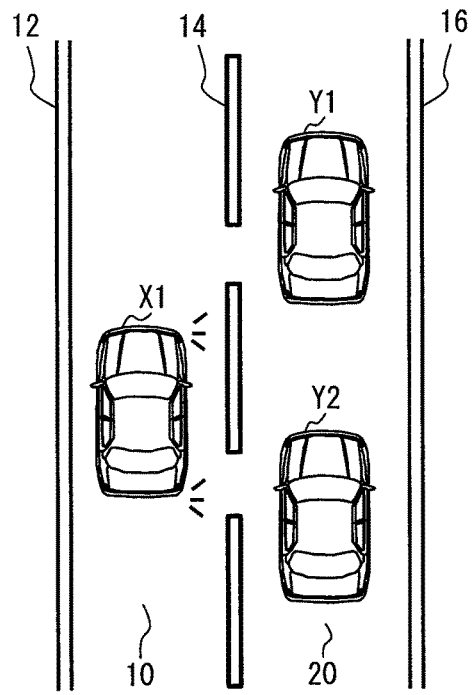
FIG. 3A is a view illustrating an example of a multi-step lane change situation.

With reference to FIG. 1 and FIG. 3A, a situation in which a vehicle attempts to change a drive lane will be explained. In the present embodiments, a subject vehicle X1 includes a lane change controller 100 and drives in a current drive lane 10. A driver of the subject vehicle X1 attempts to change a drive lane from the current drive lane 10 to an adjacent lane 20, which is located immediate next to the current drive lane 10. The current drive lane 10 is defined by lane boundary lines 12, 14. The adjacent lane 20 is defined by lane boundary lines 14, 16. Further, as an example, there are adjacent vehicles Y1, Y2 in the adjacent lane 20, so that a sufficient space between the adjacent vehicles Y1, Y2 is required in order for the subject vehicle X1 to change the drive lane (that is, move from the current drive lane 10 to the adjacent lane 20). Incidentally, the current drive lane 10 corresponds to a drive lane on which the subject vehicle X1 is moving or stopped temporally, for example, at a stop signal.

Incidentally, the concept of lane change may include, for example, a case where the subject vehicle X1 moves from the current drive lane 10 to the adjacent lane 20, a case where the subject vehicle X1 moves from a merging lane to a drive lane, and a case where the subject vehicle X1 moves from a drive lane to a merging lane. In the present embodiment, the subject vehicle X1 moves toward a rightward lane, however, the present disclosure can be applied to a lane change toward a leftward lane.

First Embodiment

A first embodiment of the present disclosure will be described with reference to FIG. 1 to FIG. 8. In the first embodiment, the subject vehicle X1 is capable of performing an autonomous driving. A driver drives the subject vehicle X1 manually before initiating the lane change. When the driver wishes to change a drive lane and operates an instruction portion, the subject vehicle X1 shifts to an autonomous drive mode. The subject vehicle X1 attempts to change the drive lane according to a multi-step lane change process.

(Overall Configuration of a Multi-Step Lane Change System)

A configuration of a lane change controller 100 and related vehicle systems will be explained with reference to FIG. 1 and FIG. 2. In the present embodiment, the lane change controller 100 is placed on the subject vehicle X1. The multi-step lane change system may be an example of a lane change system.

In addition to the lane change controller 100, the subject vehicle X1 has other components and systems in order to realize an autonomous drive mode by a co-operation of, for example, a human machine interface (HMI) 200, a vehicle information detector 300, a peripheral monitor 400, a body system 500, a powertrain system 600, a brake system 700, a steering system 800, a locator system 900, a communication system 1000, and an in-vehicle local area network (LAN) 1100, as illustrated in FIG. 1.

The lane change controller 100 includes a microcomputer having a central process unit (CPU) 110 and a memory 120. The CPU 110 corresponds to an example of a processor. The memory 120 includes a semiconductor memory such as a random access memory (RAM), a read only memory (ROM), a flash memory or the like. The memory 120 is an example of a non-transitory computer readable medium. Various functions of the lane change controller 100 are carried out by executing a program stored in the memory 120. By executing the program, a method corresponding to the program is executed. The lane change controller 100 may include an input-output (I/O) terminal and a bus line (not shown) connecting together the above mentioned configuration elements.

The HMI 200 may include a turn signal switch 210 and a notification device 220.

The turn signal switch 210 may correspond to an example of an instruction portion. The turn signal switch 210 may include a turn signal lever (not shown), which may be placed near a steering wheel. Incidentally, the turn signal switch 210 may be any kind of switch which receives the intention of the driver and indicates a direction of lane change. For example, the turn signal switch 210 may be an arrow image displayed on the display device.

The driver operates the turn signal switch 210 to input a lane change instruction when the driver intends to change a drive lane where the subject vehicle X1 is driving to another lane. The turn signal switch 210 outputs to the lane change controller 100, a lane change initiation signal upon receiving the lane change instruction from the driver.

The lane change controller 100 executes a multi-step lane change process illustrated in FIG. 3A to FIG. 6. The turn signal switch 210 outputs the lane change initiation signal at a time of a lane change of the subject vehicle X1 upon receiving the lane change instruction.

The notification device 220 may include, for example, a speaker (not shown) and a display device (not shown). The notification device 220 provides notification to the driver when the subject vehicle X1 is unable to perform the lane change. The notification device 220 provides notification to the driver when the lane change controller 100 asks whether to attempt the lane change again in a case where the subject vehicle X1 does not perform the lane change and is positioned to a predetermined position.

The vehicle information detector 300 may include, for example, a vehicle speed sensor 310 for detecting a speed of the subject vehicle X1, an acceleration sensor 320, and a steering angle sensor 330. The vehicle information detector 300 provides vehicle information and a driving state of the subject vehicle X1. The vehicle information may include transitional information, which changes during driving of the subject vehicle X1 such as an operation state of an engine and a motor regarding vehicle driving, and a state of a battery. In addition, the vehicle information may include static information such as a vehicle weight, and a vehicle width of the subject vehicle X1.

The peripheral monitor 400 may include, for example, a camera 410, a millimeter wave sensor 420, LiDAR (light detection and ranging), or any types of sensors to detect peripheral environment of the subject vehicle X.

The peripheral monitor 400 obtains information regarding the current drive lane 10, the adjacent lane 20, lane boundary lines 12, 14, 16, and the adjacent vehicles Y1, Y2. The peripheral monitor 400 obtains information regarding the adjacent lane 20 located next to the current drive lane 10 and the lane boundary line 14 separating the current drive lane 10 from the adjacent lane 20, when the subject vehicle X1 is located on the current drive lane.

The camera 410 is placed in a cabin, a bumper, a door mirror, or the like, so that the camera 410 captures an image around the subject vehicle X1. The camera 410 captures a road surface to capture an image of the lane boundary lines 12, 14, 16 and the adjacent lane 20. The camera 410 repeatedly captures images periodically during the multi-step lane change process. The peripheral monitor 400 outputs an image captured with the camera 410 and a detection result of the camera 410 and the millimeter wave sensor 420. The camera 410 may be configured from a single camera or multiple camera devices.

The body system 500 includes a turn signal light 510. The body system 500 has functions such as a lighting control of the turn signal light 510, a state notification of the turn signal light 510, or the like. The turn signal light 510 starts to blink upon receiving the lane change initiation signal from the turn signal switch 210. The turn signal light 510 expresses an intention of the lane change of the driver for another vehicle including the adjacent vehicles Y1, Y2.

The powertrain system 600 has a function for controlling a powertrain of the subject vehicle X1.

The brake system 700 has a function for controlling a brake operation of the subject vehicle X1.

The steering system 800 has a function for steering the subject vehicle X1. Each of the steering system 800, the brake system 700, and the powertrain system 600 or their combination may correspond to a vehicle guide system. The vehicle guide system controls operation of the subject vehicle X1, and controls vehicle speed, steering angle, or the like.

The locator system 900 includes a navigation device 910, a global positioning system (GPS) device 920, and a road map information memory 930. The locator system 900 obtains positional information of the subject vehicle X1 and provides a route guidance to a destination place. The road map information memory 930 stores map information, information of a road width, or the like. The GPS device 920 is an example of satellite positioning system, and may also be GLONASS, Galileo, Quasi-zenith satellites, or the like.

The communication system 1000 includes a wireless communication device (not shown), which performs wireless communication between a vehicle and a vehicle, and between a vehicle and infrastructure (for example, an on-road device, a data center).

The lane change controller 100, the HMI 200, the vehicle information detector 300, the peripheral monitor 400, the body system 500, the powertrain system 600, the brake system 700, the steering system 800, the locator system 900 and the communication system 1000 can communicate with each other through the in-vehicle LAN 1100, so as to transmit and receive data with each other.

Figure 2:
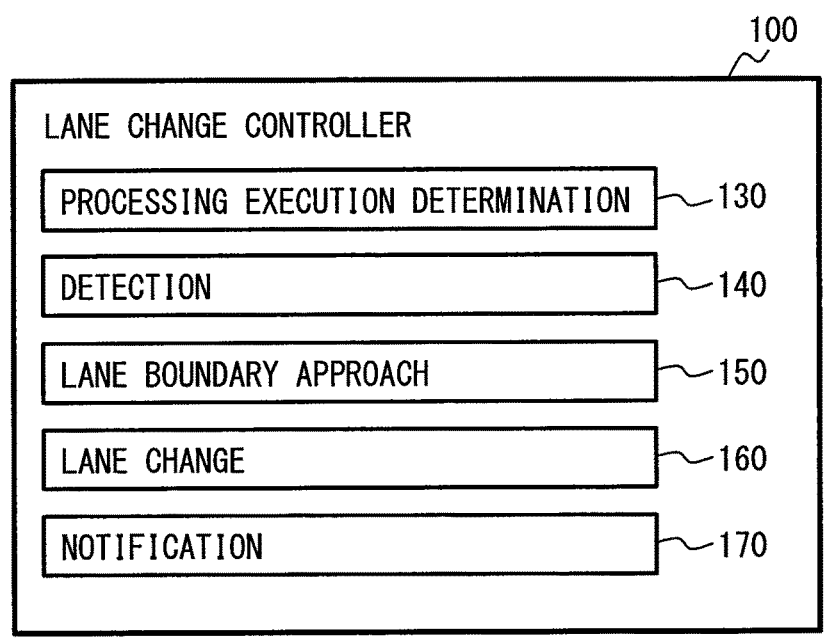
FIG. 2 is a block diagram illustrating configuration of the lane change controller according to the present embodiment.

As illustrated in FIG. 2, the lane change controller 100 may be further configured to include a process execution determination portion 130, a detection portion 140, a lane boundary approach portion 150, a lane change portion 160, and a notification portion 170. The detection portion 140 includes, for example, a timer. Incidentally, each process realizing the above portions configured within the lane change controller 100 is not limited to software. A part or all of the portions may be realized by hardware executing the programmed software, the hardware being obtained by combining a logic circuit and an analog circuit, or the like.

A combination of the lane change controller 100 and at least one of the HMI 200, the vehicle information detector 300, the peripheral monitor 400, the body system 500, the powertrain system 600, the brake system 700, the steering system 800, the locator system 900, the communication system 1000, and the in-vehicle LAN 1100 may correspond to the multi-step lane change system 1200.

(Example of Multi-Step Lane Change Situation)

Referring to FIG. 3A to FIG. 3F, a multi-step lane change situation performed by the lane change controller 100 will be exemplified. In the present embodiment, the subject vehicle X1 includes the multi-step lane change system 1200.

As illustrated in FIG. 3A, the subject vehicle X1 drives in the current drive lane 10. A driver of the subject vehicle X1 wishes to move from the current drive lane 10 to the adjacent lane 20. In this example, the subject vehicle X1 intends to move to a rightward lane. The subject vehicle X1 is located near the middle of the drive lane on the current drive lane 10.

FIG. 3A shows a case where the subject vehicle starts to change the drive lane. The driver operates the turn signal switch 210 for inputting an instruction (the lane change instruction) of lane change and a direction to which the driver intends to move. The turn signal light 510 corresponding to the direction to which the driver intends to move starts to blink. The turn signal light 510 corresponds to an example of a direction indicator that blinks upon receiving the lane change initiation signal from the turn signal switch 210.

Figure 3B:
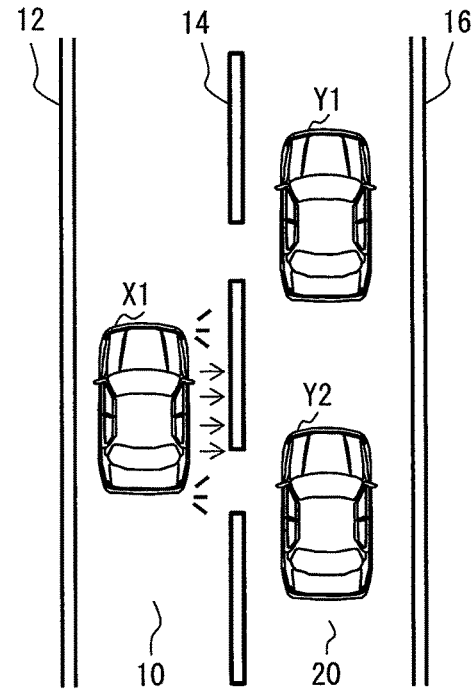
FIG. 3B is a view illustrating a continuation of the multi-step lane change situation.

FIG. 3B shows a case where the subject vehicle X1 approaches the lane boundary line 14, which separates the current drive lane 10 from the adjacent lane 20.

Figure 3C:
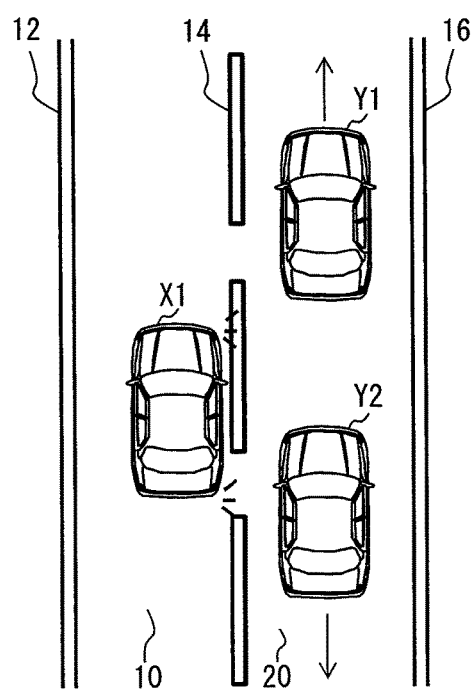
FIG. 3C is a view illustrating the continuation of the multi-step lane change situation.

FIG. 3C shows a case where drivers in the adjacent vehicles Y1, Y2 noticed the existence and the intention of the lane change of the subject vehicle X1, so that the adjacent vehicle Y1 moves forward relatively and the adjacent vehicle Y2 moves backward relatively with respect to the subject vehicle X1. Thus, a sufficient space is generated between the adjacent vehicles Y1, Y2 for the subject vehicle X1 to move into the adjacent lane 20.

Figure 3D:
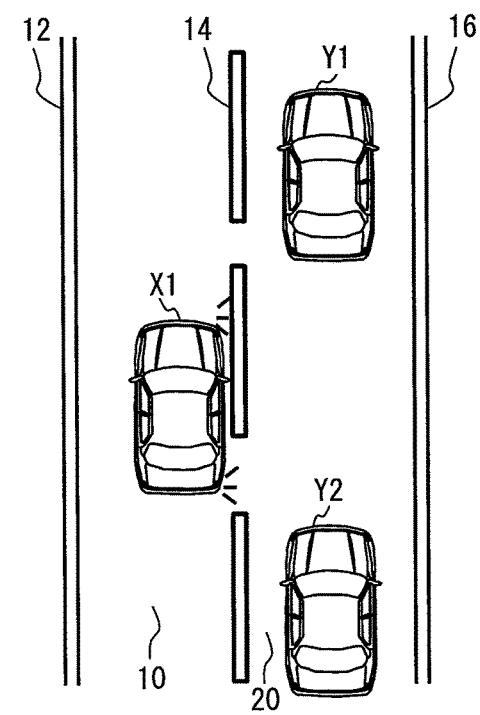
FIG. 3D is a view illustrating the continuation of the multi-step lane change situation.
Figure 4:
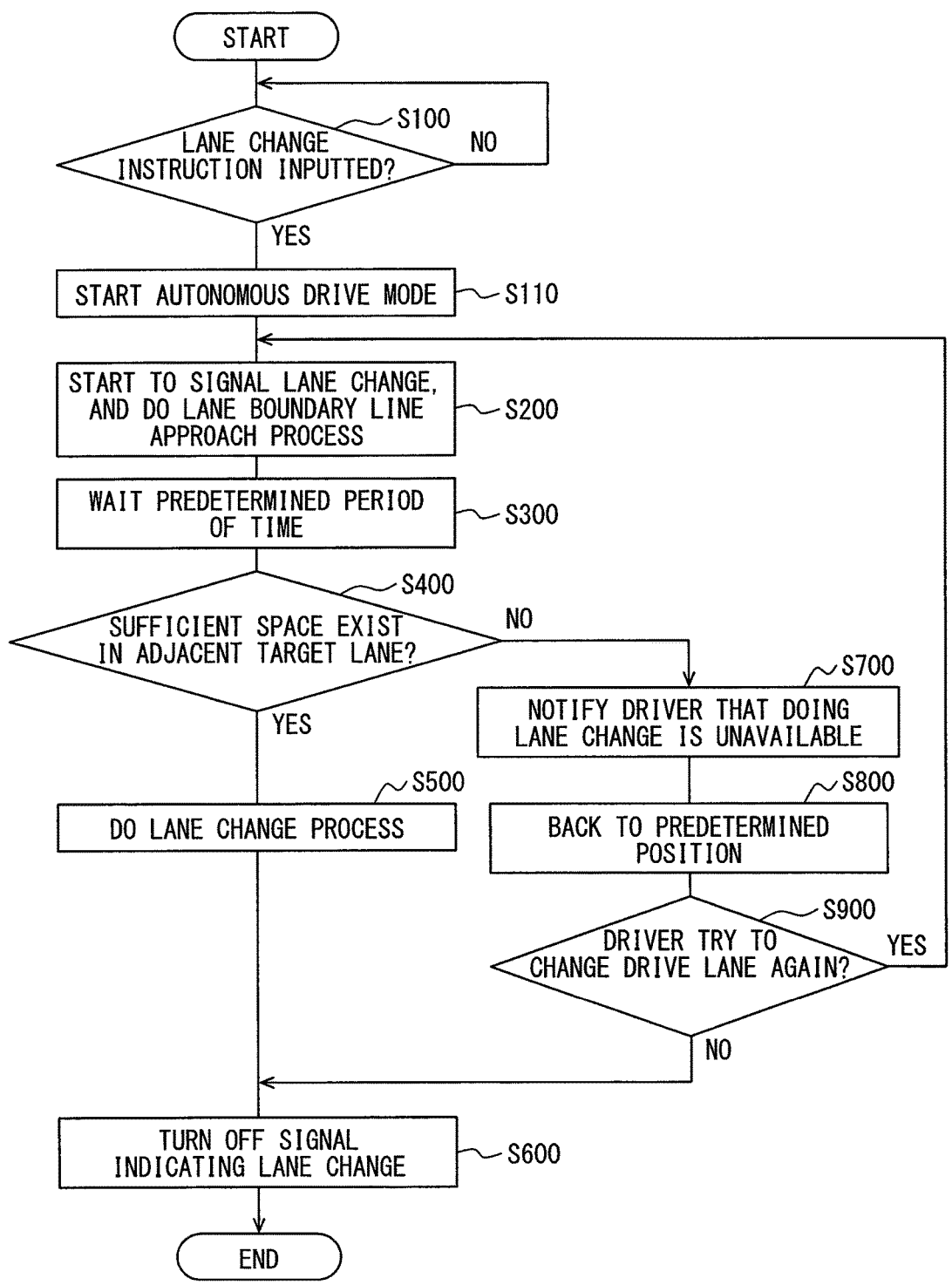
FIG. 4 is a flowchart illustrating a multi-step lane change process according to the present embodiment.

FIG. 3D shows a case where the lane change controller 100 determines whether a lane change is possible, that is, determines during a predetermined period of time whether there is sufficient space ahead the subject vehicle X1 and behind the subject vehicle X1 in the adjacent lane 20.

When there is insufficient space after the predetermined time, the lane change controller 100 notifies the driver of the situation. The subject vehicle X1 backs to a predetermined position in the current drive lane 10. The predetermined position in the width direction may be an original position before the multi-step lane process, the middle of the current drive lane 10, or somewhere on the current drive lane 10.

FIG. 3E and FIG. 3F show a case where the subject vehicle X1 is controlled from the current drive lane 10 to the adjacent lane 20 at a position between the adjacent vehicles Y1, Y2.

(Example of Multi-Step Lane Change Process)

The multi-step lane change process will be explained with reference to FIG. 4 to FIG. 8. The multi-step lane change process may be executed while an ignition switch of the subject vehicle X1 is in an ON state.

At S100, the process execution determination portion 130 determines, based on the lane change initiation signal of the turn signal switch 210, whether the driver inputs the lane change instruction to the turn signal switch 210, that is, whether the lane change is instructed. The process shifts to S110 when the process execution determination portion 130 determines that the lane change instruction is inputted. By contrast, when the process execution determination portion 130 does not determine that the lane change instruction is inputted, the process returns to S100.

At S110, the process execution determination portion 130 transmits a command to start the autonomous drive mode to the HMI 200, the vehicle information detector 300, the peripheral monitor 400, the body system 500, the powertrain system 600, the brake system 700, the steering system 800, the locator system 900 and the communication system 1000 through the in-vehicle LAN 1100, and the process shifts to S200.

At S200, the turn signal light 510 starts to blink upon receiving the lane change initiation signal from the turn signal switch 210. In addition, at S200, the lane boundary approach portion 150 performs a lane boundary line approach process.

Figure 5:
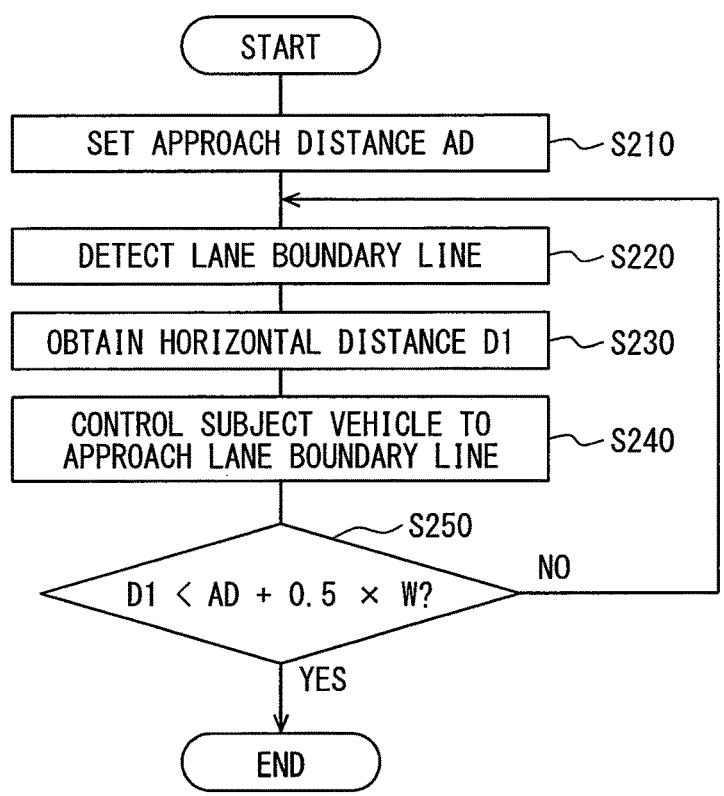
FIG. 5 is a flowchart illustrating a lane boundary line approach process according to the present embodiment.
Figure 6:
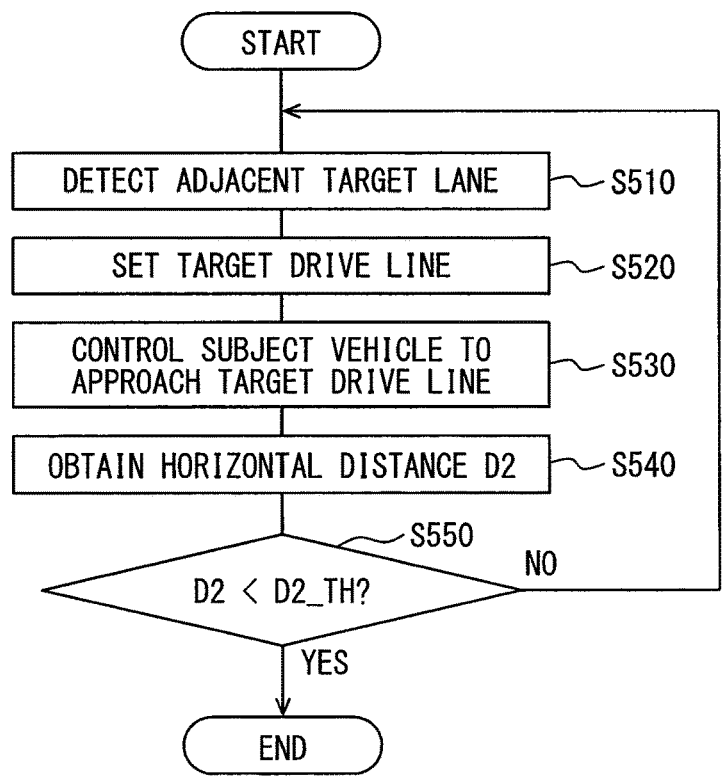
FIG. 6 is a flowchart illustrating a lane change process according to the present embodiment.
Figure 7A:
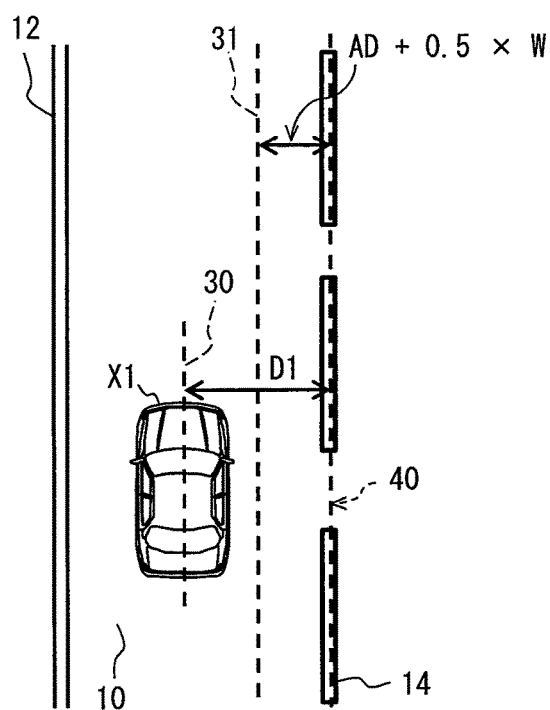
FIG. 7A is a view illustrating a positional relation between the subject vehicle and the lane boundary line when a subject vehicle drives in a current drive lane according to the present embodiment.
Figure 7B:
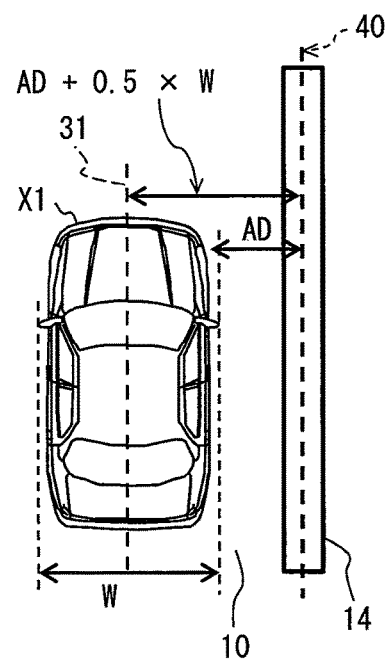
FIG. 7B is a view illustrating a positional relation between the subject vehicle and the lane boundary line when a subject vehicle drives in a current drive lane according to the present embodiment.

Herein, the lane boundary line approach process will be explained with reference to FIG. 5, FIG. 7A, and FIG. 7B.

At S210, the lane boundary approach portion 150 sets an approach distance AD, which is a distance between the central line 40 of the lane boundary line 14 and a side part of the subject vehicle X1, the side part being closest to the adjacent lane 20 in the subject vehicle X1. For example, the closest side part of the subject vehicle X1 corresponds to a side mirror, a door, a tire, or a wheel of the subject vehicle X1. The central line 40 is a line going through the middle of the lane boundary line 14 in a direction along the road.

The distance from the side part of the subject vehicle X1 to the central line 40 of the lane boundary line 14 may be referred to as a clearance between the subject vehicle X1 and the central line 40. In this embodiment, the side part represents a right side of the subject vehicle X1. When the subject vehicle X1 intends to move to a leftward lane, the side part represents the left side of the subject vehicle X1. The approach distance AD may be a predetermined value stored in the memory 120, and the lane boundary approach portion 150 receives from the memory 120.

At S220, the lane boundary approach portion 150 detects the lane boundary line 14 based on the information from the peripheral monitor 400, that is, based on the captured image captured by the camera 410.

At S230, based on the captured image, the lane boundary approach portion 150 calculates a horizontal distance D1 from the central line 30 of the subject vehicle X1 to the central line 40 of the lane boundary line 14. A direction of the horizontal distance D1 corresponds to a width direction of the subject vehicle X1. As illustrated in FIG. 7A, the central line 30 represents a central line located midpoint of lateral width of the subject vehicle X1 in a longitudinal direction.

At S240, the lane boundary approach portion 150 controls the subject vehicle X1 to approach the lane boundary line 14 by controlling the powertrain system 600, the brake system 700, the steering system 800 or the like.

For example, the lane boundary approach portion 150 may control the steering system 800 to change a steering angle of the subject vehicle X1. The lane boundary approach portion 150 may control the brake system 700 to decrease the rotation speed of at least one of a right front wheel and a right rear wheel. The lane boundary approach portion 150 may control the powertrain system 600 to provide drive power to at least of a left front wheel and a left rear wheel. A vehicle speed of the subject vehicle X1 may be controlled. Various suitable methods can be applied in order to control the subject vehicle X1 to approach the lane boundary line 14.

At S250, the lane boundary approach portion 150 determines whether "D1<AD+0.5×W" is satisfied. W represents a value corresponding to the vehicle width stored in the vehicle information detector 300, and "0.5×W" is equal to a half-length of the vehicle width. "AD+0.5×W" represents the sum of the approach distance and the half-length of the subject vehicle X1. At S250, it is determined whether the horizontal distance D1 is less than the sum of the approach distance AD and the half of the vehicle width W. A position apart from the central line 40 by the distance of "AD+0.5× W" provides a target approach line 31, as illustrated in FIG. 7A and FIG. 7B. The target approach line 31 represents the central line going through the middle of the subject vehicle X1 in a vehicle longitudinal direction at the time when the subject vehicle X1 has approached the lane boundary line 14. In other words, the central line 30 overlaps with the target approach line 31 when the lane boundary line approach process completes.

When the horizontal distance D1 is equal to or greater than the sum of the approach distance AD and the half of the vehicle width W, it is determined that the subject vehicle X1 has not approached the lane boundary line 14 enough, and the process shifts to S220.

When the horizontal distance D1 is less than the sum of the approach distance AD and the half of the vehicle width W, it is determined that the subject vehicle X1 has approached the lane boundary line 14 enough. In this case, the subject vehicle X1 is driving on the current drive lane 10 apart from the lane boundary line 14 while keeping the approach distance AD when the subject vehicle X1 has approached the lane boundary line 14. The process of FIG. 5 terminates and shifts to S300.

At S300, the detection portion 140 waits for passage of a period of time (for example, 5 seconds, or 10 seconds). At S300, the subject vehicle X1 has moved close to the lane boundary line 14 while blinking the turn signal light 510. The movement of the subject vehicle X1 to the lane boundary line 14 may notify the adjacent vehicles Y1, Y2 of the intention that the subject vehicle X1 intends to change a drive lane. During the period of time, drivers in the adjacent vehicles Y1, Y2 are supposed to make a sufficient space between the adjacent vehicles Y1, Y2. When the period of time elapses, the process shifts to S400.

At S400, the detection portion 140 determines whether a sufficient space exists ahead of the subject vehicle X1 and behind the subject vehicle X1 in the adjacent lane 20. In other words, the detection portion 140 determines whether a sufficient space has been generated between a vehicle in the adjacent lane 20 ahead the subject vehicle X1 and a vehicle in the adjacent lane 20 behind the subject vehicle X1. The space between the adjacent vehicles Y1, Y2 may be provided when the adjacent vehicle Y1 moves forward with respect to the subject vehicle X1, or when the adjacent vehicle Y2 moves backward with respect to the subject vehicle X1.

The detection portion 140 receives a detection result from the peripheral monitor 400 so as to detect the adjacent vehicles Y1, Y2 existing in the adjacent lane 20. The detection portion 140 receives data from the vehicle information detector 300.

When the adjacent vehicles Y1, Y2 in the adjacent lane 20 have moved sufficiently apart from the subject vehicle X1, the detection portion 140 determines that lane change to the adjacent lane 20 is possible. In this case, it is determined that there is sufficient space for the subject vehicle X1 to move between the adjacent vehicles Y1, Y2, (that is, the sufficient space exists ahead the subject vehicle X1 and behind the subject vehicle X1). In this case, the process shifts to S500. The sufficient space may correspond to a length corresponding to, for example, twice to three times of a longitudinal length of the subject vehicle X1. The sufficient space may be determined in various ways. The sufficient space at least may be a length longer than a longitudinal distance of the subject vehicle X1.

The lane change controller 100 may calculate the relative speed and the relative position between the subject vehicle X1 and each of the adjacent vehicles Y1, Y2, which can be determined by information from the vehicle information detector 300, the peripheral monitor 400, the locator system 900, and the communication system 1000. Based on the calculation result, the lane change controller 100 may determine whether there is sufficient space ahead of the subject vehicle X1 and behind the subject vehicle X1 in the adjacent lane 20, at a position corresponding to the current position. The sufficient space may be detected by using the peripheral monitor 400, the millimeter wave sensor 420, the vehicle-to-everything (V2X) communication, or the like.

When the adjacent vehicles Y1, Y2 in the adjacent lane 20 have not moved sufficiently apart from the subject vehicle X1, that is, upon determining that there is insufficient space ahead of the subject vehicle X1 or behind the subject vehicle X1, the detection portion 140 determines that the subject vehicle X1 should refrain from changing lane to the adjacent lane 20. Here, the lane change controller 100 is prevented from controlling the subject vehicle X1 to move from the current drive lane 10 to the adjacent lane 20 upon detecting that there is insufficient space. In other words, the lane change controller 100 avoids the lane change of the subject vehicle X1 from the current drive lane 10 to the adjacent lane 20 upon detecting that there is insufficient space. In this case, the process shifts to S700.

At S700, the notification portion 170 controls the notification device 220 to inform the driver that the lane change portion 160 is prevented from leading the subject vehicle X1 to move from the current drive lane 10 to the adjacent lane 20. This notification may be performed by sound from the speaker, a message displayed on the display device, or the like. With this, the driver can recognize that the lane change is not performed.

At S800, the lane boundary approach portion 150 controls the subject vehicle X1 to lead toward a predetermined position in the current drive lane 10. The lane boundary approach portion 150 controls the subject vehicle X1 to lead the predetermined position in the current drive lane 10 by the vehicle guide system.

At S900, the notification portion 170 asks the driver whether to attempt the lane change of the subject vehicle X1 again through a message displayed on the display device. Incidentally, various methods such as message, vibration, audio, signal, can be used for asking whether to attempt the lane change again.

At S500, upon determination that the sufficient space exists between the adjacent vehicles Y1, Y2, the lane change portion 160 performs a lane change process. The lane change process will be explained with reference to the flowchart illustrated in FIG. 6.

The lane change portion 160 controls the subject vehicle X1 to move from the current drive lane 10 to the adjacent lane 20 by the vehicle guide system. The lane change portion 160 controls the vehicle guide system to lead the subject vehicle X1 to move from the current drive lane 10 to the adjacent lane 20 upon detecting that the sufficient space is available between a vehicle (corresponding to the adjacent vehicle Y1) in the adjacent lane 20 ahead the subject vehicle X1, and a vehicle (corresponding to the adjacent vehicle Y2) in the adjacent lane 20 behind the subject vehicle X1.

At S510, the lane change portion 160 detects the lane boundary lines 14, 16 based on data from the peripheral monitor 400, and detects the adjacent lane 20.

Figure 8:
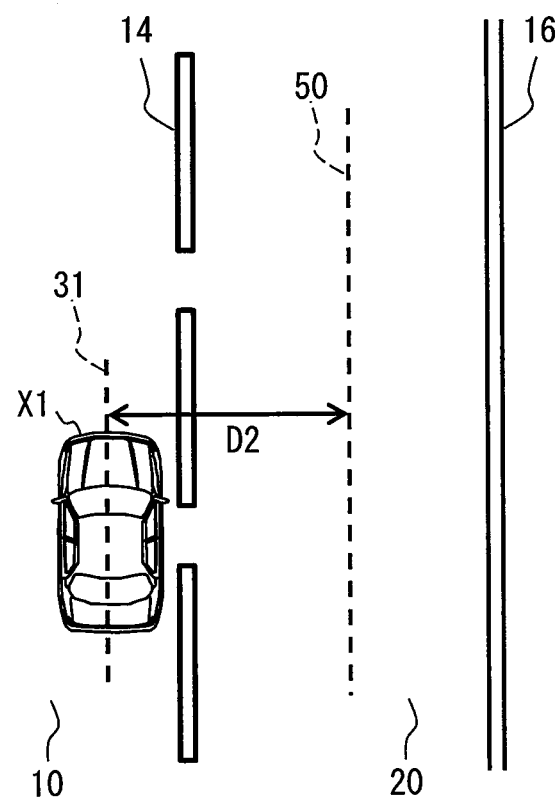
FIG. 8 is a view illustrating a positional relation between the subject vehicle and a target drive line in an adjacent lane according to the present embodiment.

At S520, the lane change controller 100 sets a target drive line 50 in the adjacent lane 20 as illustrated in FIG. 8. For example, the target drive line 50 corresponds to the middle of the adjacent lane 20.

At S530, the lane change portion 160 controls the subject vehicle X1 to approach the target drive line 50 by the vehicle guide system including the powertrain system 600, the brake system 700, the steering system 800 or the like. The subject vehicle X1 moves from the current drive lane 10 to the adjacent lane 20. In other words, process similar to S240 may be performed at S530.

At S540, the lane change portion 160 calculates a horizontal distance D2 from the target approach line 31 of the subject vehicle X1 to the target drive line 50. Incidentally, since the subject vehicle X1 has approached to the lane boundary line 14, the target approach line 31 overlaps with the central line 30 of the subject vehicle X1. A direction of the horizontal distance D2 corresponds to a width direction of the subject vehicle X1. As illustrated in FIG. 8, the target approach line 31 in this case represents the central line going through the middle of the subject vehicle X1 in a vehicle longitudinal direction.

At S550, the lane change portion 160 determines whether the horizontal distance D2 is equal to or less than the predetermined distance D2_TH. When the horizontal distance D2 is greater than a predetermined distance D2_TH, the process shifts to S510. When the horizontal distance D2 is equal to or less than the predetermined distance D2_TH, it is determined that the subject vehicle X1 has approached the target drive line 50 enough. The process terminates and shifts to S600.

At S600, the detection portion 140 turns off the turn signal light 510, and the process terminates.

Therefore, the lane change controller 100 determines, based on the lane change initiation signal received from the turn signal switch 210, whether the lane change has been instructed, detects the lane boundary line 14 based on the information received from the peripheral monitor 400, controls the subject vehicle X1 to approach the lane boundary line 14 and reach a position located from a predetermined approach distance AD away from the lane boundary line 14 by the vehicle guide system, waits for elapse of a period of time, and controls the vehicle guide system to further move the subject vehicle X1 from the current drive lane 10 at the predetermined approach distance AD to the adjacent lane 20 upon detecting that a sufficient space exists between a vehicle (corresponding to the adjacent vehicle Y1) in the adjacent lane ahead of the subject vehicle and a vehicle (corresponding to the adjacent vehicle Y2) in the adjacent lane behind the subject vehicle.

According to the multi-step lane change system, when the driver instructs a lane change to a vehicle, the vehicle first approaches a lane boundary line while providing an indication of lane change. The subject vehicle X1 indicates the lane change intention through blinking the direction indicator. It may be possible to clearly express an intention of lane change to an adjacent vehicle. Even when the traffic is busy or stopped, or even when the direction indicator is within a blind spot for a driver of another vehicle, the intention of the subject vehicle to change the drive lane is clearly expressed and the direction indicator goes out from the blind spot of the driver of another vehicle. Thus, a driver in another vehicle is more likely to notice the intention of the lane change of the subject vehicle X1. Thus, it may be possible to increase noticeability of attempt of lane change by a vehicle and likelihood of a lane change of a vehicle. It may become easier and more likely for the subject vehicle X1 to change lane into a heavy traffic.

In addition, since the multi-step lane change system may include the notification portion that provides information for the driver, the lane boundary approach portion informs the driver that the lane change is prevented when the vehicle does not perform the lane change. Accordingly, it may be possible for the driver to recognize a situation in which the lane change is not performed. It may be possible for the driver to reconsider whether the lane change is attempted again so as to input the instruction of the lane change.

Further, according to this configuration, a drive only requires to input the lane change instruction when the lane change is initiated, even an elderly person or an inexperienced driver can perform a lane change or merge easily. Since the multi-step lane system performs the lane change and the merge instead of any driver who feels that a lane change and a merge is difficult. Therefore, a driver and a passenger may feel comfortable.

Second Embodiment

In the first embodiment, the subject vehicle X1, which capable of performing autonomous drive, is not in the autonomous drive mode (that is, manually operated) before the reception of the lane change instruction from the driver. When the driver intends to move the drive lane and inputs the lane change instruction, the subject vehicle X1 changes into the autonomous drive mode.

By contrast, in a second embodiment, the subject vehicle X1 is in the autonomous drive mode even before the lane change instruction is inputted.

Figure 9:
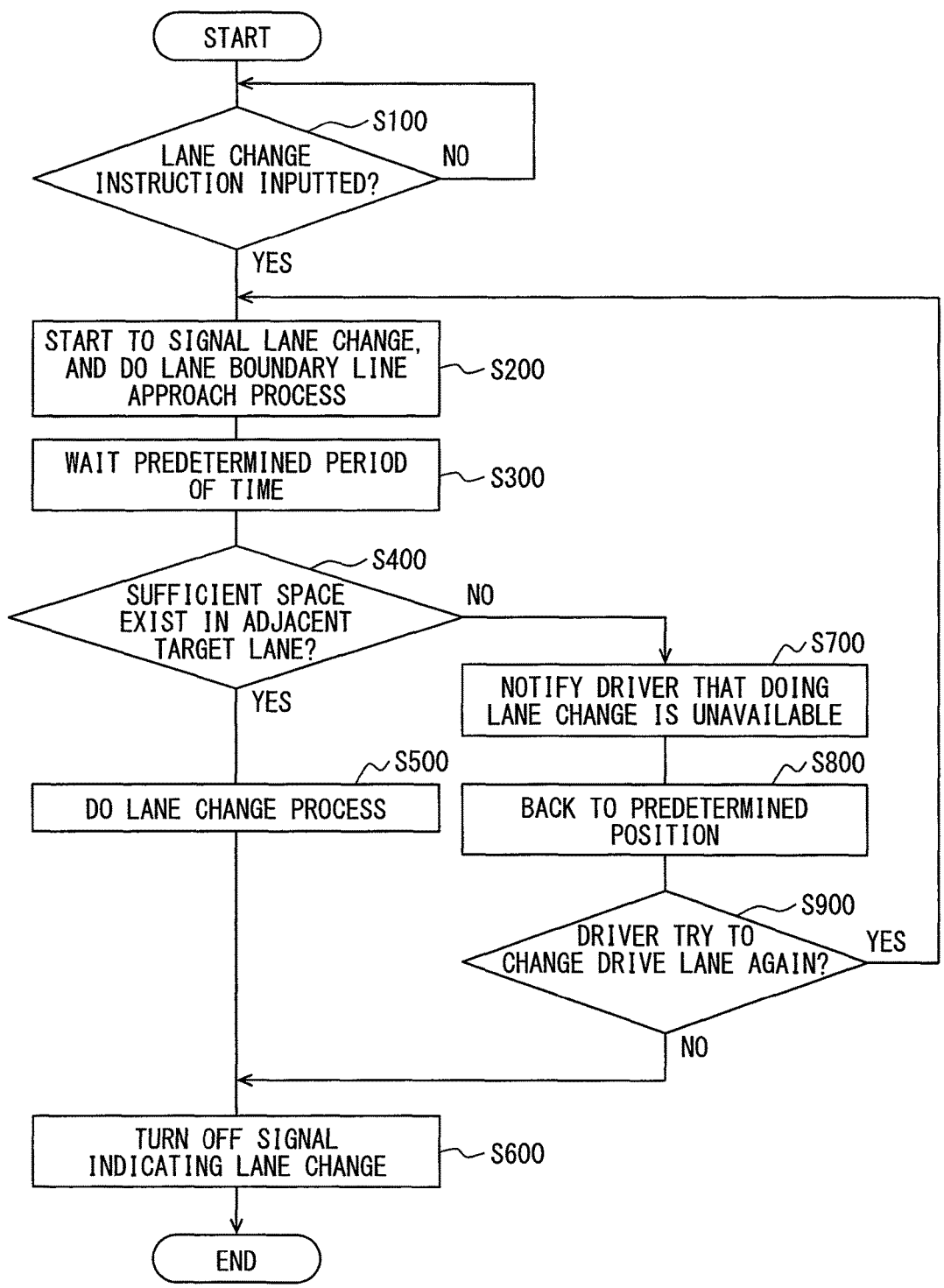
FIG. 9 is a flowchart illustrating a multi-step lane change process according to another embodiment.

The multi-step lane change process in the second embodiment also has a configuration substantially similar to the configuration in the first embodiment. Thus, a main different from the first embodiment will be described. As illustrated in FIG. 9, S110 is removed from the process of the first embodiment. Incidentally, in the second embodiment, it is supposed that a destination place has been set by, for example, a driver, the external control center placed outside the subject vehicle X1, or the like. The destination place may be set into the locator system 900, which performs a route guidance.

In the second embodiment, the locator system 900 inputs the lane change instruction to the turn signal switch 210 instead of the driver according to the preset route guidance. The turn signal switch 210 outputs the lane change initiation signal in response to the lane change instruction.

At S100 in the second embodiment, the process execution determination portion 130 determines, based on the lane change initiation signal of the turn signal switch 210, whether the lane change instruction is inputted to the turn signal switch 210, that is, whether the lane change is instructed.

The process shifts to S200 when the process execution determination portion 130 determines that the lane change instruction is inputted. By contrast, when the process execution determination portion 130 does not determine that the lane change instruction is inputted, the process returns to S100.

According to the configuration of the second embodiment, the driver only requires to set a destination place. According to this configuration, it may be possible to perform the multi-step lane change process without the lane change instruction through the HMI 200. According to this configuration, a driver may not require to input the lane change instruction once the destination place is set.

(Modifications)

Further, the multi-step lane change system 1200 may include an operation controller. More specifically, the operation controller may be implemented by an operation switch mounted on the subject vehicle X1. When the driver wishes to stop the function of the multi-step lane change system 1200, the driver operates the operation switch.

According to this configuration, it may possible to prevent the operation of the multi-step lane change process in a case where the multi-step lane change process is unnecessary such as there is no adjacent vehicle.

Further, the multi-step lane change system 1200 may include another process so that the detection portion 140 determines whether the adjacent vehicles Y1, Y2 exist in the adjacent lane 20. For example, the detection portion 140 receives the detection result of a vehicle exists in the adjacent lane 20 from the peripheral monitor 400. When the detection portion 140 determines that there is no adjacent vehicle in the adjacent lane 20, the process including S200, S300, and S400 may be skipped.

According to this configuration, it may be possible to skip unnecessary process. Thus, it may be possible to move from the current drive lane to the adjacent lane more smoothly. It may be possible to prevent from generating a peculiarity for a driver of another vehicle around the subject vehicle X1, for example, a vehicle immediate behind the subject vehicle X1.

In the above embodiments, the approach distance AD may be a predetermined value stored in the memory 120. However, the approach distance AD may be a value determined according to a vehicle speed of the subject vehicle X1, which is received from the vehicle information detector 300. For example, the approach distance AD may increase linearly according to increase of the vehicle speed. In this case, the memory 120 of the lane change controller 100 may store a table determining a relation between the vehicle speed and the approach distance AD.

Alternatively, the approach distance AD may be determined stepwise. In this case, the approach distance AD may be set to a short distance (for example, 20 cm) when the subject vehicle X1 drives slowly (for example, below 20 km/h), and to a long distance (for example, 60 cm) when the subject vehicle X1 drives fast (for example, over 100 km/h).

Alternatively, the approach distance AD may be a value determined according to the road width on which the subject vehicle X1 is driving. The width of the road may be detected by the peripheral monitor 400, or may be pre-stored in the locator system 900. According to this configuration, it may be possible to adjust the approach distance AD based on the width of the road, and therefore, it may be possible to express the intention of the lane change more suitably.

According to these alternative ways, it may be possible to set the approach distance more suitably and to increase likelihood of the lane change while ensuring safety. It may be possible to realize the multi-step lane change process by taking a drive circumstance or the like into consideration more clearly.

In the above embodiment, all component of the lane change controller 100 is included in the subject vehicle X1. However, a part of the lane change controller or a part of the vehicle guide system may be placed outside the subject vehicle X1 such as an external control center. According to this configuration, it may be possible to adjust the approach distance AD or the predetermined position in the current drive lane 10 or the predetermined position in the adjacent lane 20 more properly.

In the above embodiment, the predetermined period of time may be a fixed value. Instead, the predetermined period of time may be determined by the driver, may be determined based on the vehicle speed of the subject vehicle X1, or may be determined based on a road width.

It is noted that a flowchart or the process of the flowchart in the present application includes steps (also referred to as sections), each of which is represented, for instance, as S100. Further, each step can be divided into several sub-steps while several steps can be combined into a single step.

While the embodiments, the configurations, the aspects of the multi-step lane change system have been described by way of example, it should be appreciated that embodiments, configurations, aspects of the present disclosure are not limited to the respective embodiments, the respective configurations, and the respective aspects described above. For example, embodiments, configurations, aspects obtained by appropriately combining technical portions disclosed in different embodiments, configurations, and aspects are included within a range of embodiments, configurations, and aspects of the present disclosure.

What is claimed is:

1. A lane change system for a subject vehicle comprising:
   a peripheral monitor that obtains information regarding an adjacent lane and a lane boundary line separating a current drive lane from the adjacent lane, when the subject vehicle is located on the current drive lane;
   an instruction portion that outputs a lane change initiation signal at a time of a lane change of the subject vehicle upon receiving a lane change instruction;
   a direction indicator that provides another vehicle with an indication of an intention of the lane change upon receiving the lane change initiation signal;
   a vehicle guide system that controls an operation of the subject vehicle; and
   a lane change controller configured to:
   (i) detect the lane boundary line based on the information received from the peripheral monitor and calculate a distance between the subject vehicle and the lane boundary line;
   (ii) control the subject vehicle to approach the lane boundary line and reach a position located from a predetermined approach distance away from the lane boundary line by the vehicle guide system;
   (iii) wait for elapse of a period of time while providing the indication of the intention of the lane change to another vehicle; and
   (iv) control the vehicle guide system to further move the subject vehicle from the current drive lane at the predetermined approach distance to the adjacent lane.

2. The lane change system according to claim 1, wherein:
   the lane change controller is further configured to determine whether a sufficient space exists ahead of the subject vehicle and behind the subject vehicle in the adjacent lane; and
   the vehicle guide system moves the subject vehicle from the current drive lane to the adjacent lane upon detecting that there is the sufficient space.

3. The lane change system according to claim 2, further comprising:
   a notification device that notifies a driver that the lane change has been prevented,
   wherein:
   the lane change controller is prevented from leading the subject vehicle from the current drive lane to the adjacent lane upon detecting that there is insufficient space, and the notification device informs that the lane change has been prevented.

4. The lane change system according to claim 3, wherein:
   the lane change controller controls the subject vehicle to back toward a predetermined position in the current drive lane upon determining that the lane change has been prevented.

5. The lane change system according to claim 4, wherein:
   the notification device asks whether to attempt the lane change again.

6. A lane change controller for a subject vehicle driving in a current drive lane, comprising:
   a processor; and
   a memory coupled to the processor and storing instructions executable by the processor to cause the processor to:
   (i) detect a lane boundary line separating the current drive lane (10) and an adjacent lane and detect the adjacent lane;
   (ii) receive an instruction indicating a lane change of the subject vehicle to implement a lane change from the current drive lane to the adjacent lane;
   (iii) cause, upon the instruction, the subject vehicle to approach the lane boundary line and reach a position located from a predetermined approach distance away from the lane boundary line;
   (iv) cause, upon the instruction, indication of an intention of the lane change to another vehicle;
   (v) wait for elapse of a predetermined period of time while providing the indication;
   (vi) determine whether a sufficient space exists between a vehicle in the adjacent lane ahead of the subject vehicle and a vehicle in the adjacent lane behind the subject vehicle; and
   (vii) cause, upon determination that the sufficient space exists, the subject vehicle to move from the current drive lane to the adjacent lane.

7. A lane change system for a subject vehicle comprising:
   a peripheral monitor that obtains information regarding an adjacent lane and a lane boundary line separating a current drive lane from the adjacent lane, when the subject vehicle is located on the current drive lane;
   a direction indicator that provides another vehicle with an indication of an intention of the lane change; and a lane change controller configured to:
  (i) detect the lane boundary line based on the information received from the peripheral monitor and calculate a distance between the subject vehicle and the lane boundary line;
  (ii) control the subject vehicle to approach the lane boundary line and reach a specified position located from a predetermined approach distance away from the lane boundary line;
  (iii) wait for elapse of a period of time while providing the indication of the intention of the lane change to another vehicle; and
  (iv) control the vehicle to further move the subject vehicle from the specified position to the adjacent lane.

* * * * *